UNITED STATES PATENT OFFICE.

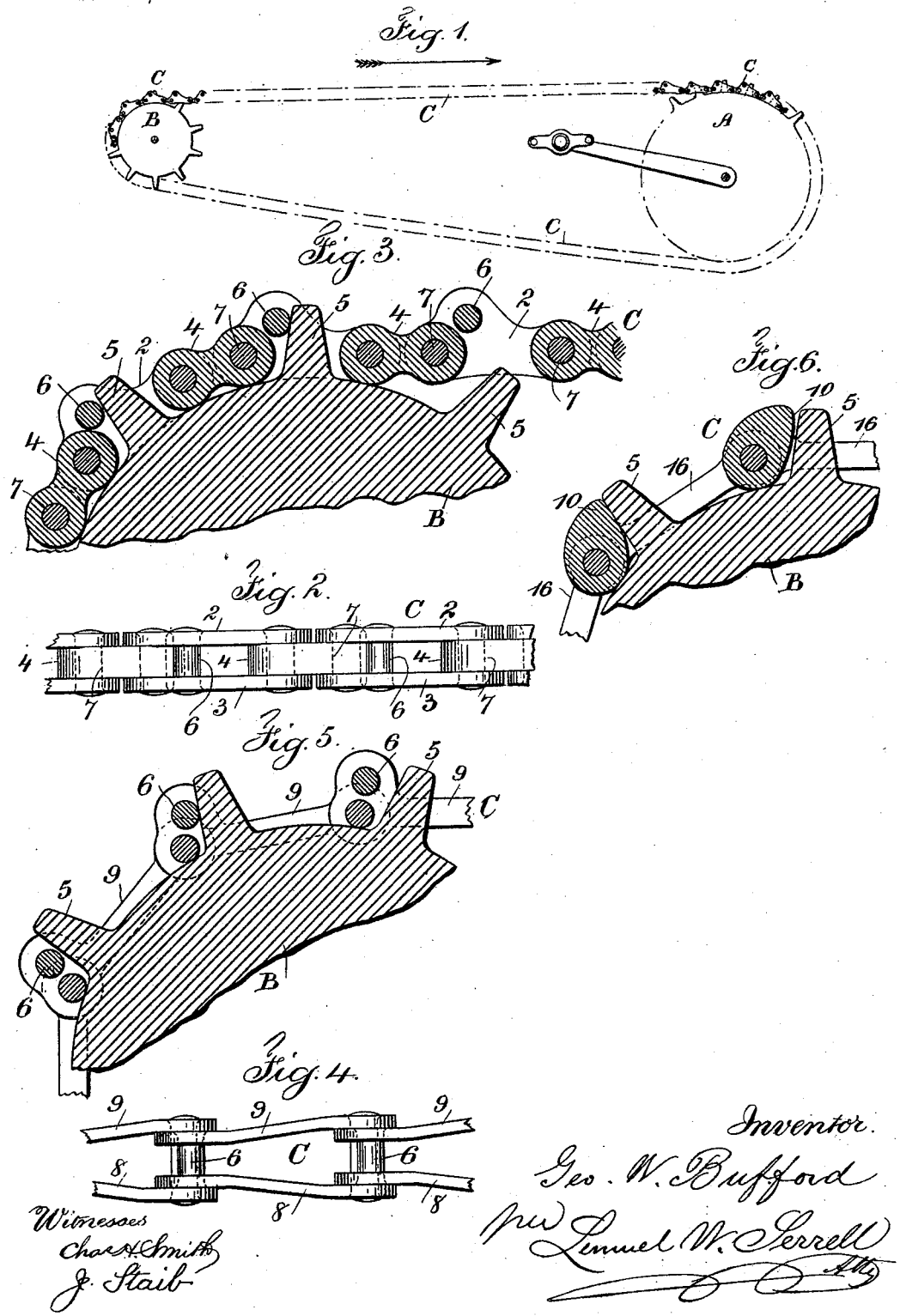

GEORGE W. BUFFORD, OF BROOKLYN, NEW YORK.

CHAIN FOR SPROCKET-WHEELS.

SPECIFICATION forming part of Letters Patent No. 595,937, dated December 21, 1897.

Application filed November 5, 1895. Serial No. 568,003. (No model.)

*To all whom it may concern:*

Be it known that I, GEORGE W. BUFFORD, a citizen of the United States, residing at Brooklyn, in the county of Kings and State of New York, have invented an Improvement in Chains for Sprocket-Wheels, of which the following is a specification.

Chains are extensively employed in transmitting power from one sprocket-wheel to another, and with the sprocket-wheel that is rotated by the chain such chain occupies a tangential position at the side where the power is applied to draw such chain off the sprocket-wheel, the chain at the other side usually being under but little tension. In transmitting power in this manner the pivots between the links of the chain are exposed to considerable wear, and also the projections upon the sprocket-wheel. This arises from the fact that the links of the chain which are in contact with the sprocket-wheel stand at angles to the tangential portion of the chain, and these links swing as they come up into line with the straight portion of the chain, and this swinging motion is at the time the greatest strain is upon such links; and the links and projections of the sprocket-wheel are also exposed to wear at the same time, because there is a sliding motion between the projection and the link as the link swings into the straight tangential position and the projection draws away from the chain, and the tendency to wear increases as the pivotal connections wear and the chain lengthens, because the chain does not properly fit the sprocket-wheel, and there is a slackness to be taken up as the tension upon the chain is transferred from one projection to the other in succession upon the sprocket-wheel as such wheel rotates and the projections separate from the chain.

The object of the present invention is to lessen the strain and wear upon the pivots of the chain, to lessen the wear upon the projections of the sprocket-wheel and upon the portions of the chain coming into contact therewith by separating such parts by a swinging movement instead of a sliding movement, and by the present improvement the principal strain or tension is gradually transferred from one projection to the next upon the sprocket-wheel, so as to avoid concussion and cause the chain to act with uniformity and reliability when the chain is new or when such chain may have become lengthened by wear upon the pivotal connections between the links.

The aforesaid object is accomplished by providing a bearing upon each link near the rear end thereof, which bearing is above and forms an angle with the pivots of the link, so as to come in contact with the projection upon the sprocket-wheel, and as the links swing from the angular position upon the wheel to the straight tangential position of the chain as it leaves the wheel the angular bearing of each link in succession swings back from its contact with the projection on the sprocket-wheel and separates from such projection and thereby transfers the strain to the next link and projection, and in these movements the angular bearing has but a slight sliding or turning motion where it is in contact with the sprocket-wheel projection, and hence there is but little wear at this point, and the strain or tension of the chain is applied through the angular bearings to the sprocket-wheel projections and there is but little strain upon the pivotal connections of the links until after such links come into a straight line. Hence the wear upon the pivot-pins is reduced to a minimum, because such wear ordinarily does not arise from the tension, but from the swinging movement when under tension.

In the drawings, Figure 1 is a diagrammatic illustration of a driving and driven sprocket-wheel and the endless chain passing around the same. Fig. 2 is a plan view in larger size, showing a portion of the chain. Fig. 3 is a diagrammatic sectional view showing a part of the chain and its angular bearings upon the sprocket-wheel in the form which I find most advantageous to employ. Fig. 4 is a plan, and Fig. 5 a diagrammatic section, of the links in modified form; and Fig. 6 is a similar view with the angular bearings in a different shape.

In Fig. 1, A illustrates the driving sprocket-wheel, and B the driven wheel, and C the endless chain, and it is to be understood that these may be of any desired size or relative proportions, and in this figure the upper part of the endless chain is represented as under tension and occupying a tangential position to the respective sprocket-wheels, and the lower or returning part of such chain may hang comparatively loose.

It will be borne in mind that in practice it has been found that the wear upon the driving sprocket-wheel is comparatively little, because the links of the chain are pressed firmly down into the spaces between the projections in consequence of the chain being under tension where it comes into contact with the driving sprocket-wheel, and the parts remain in this position while passing half-way around the wheel, and the chain where it separates from the driving sprocket-wheel is under but little tension; but the wear both upon the chain and upon the sprocket-wheel arises mostly at the place where the chain passes off at a tangent from the driven sprocket-wheel, and to lessen the wear at this part is the special object of the present invention.

The links made use of may be of any desired size or shape, and upon the links of the chain there are angular bearings that come in contact with the projections of the sprocket-wheel. These angular bearings may vary according to the peculiar shape of the link and the peculiar shape of the projection on the sprocket-wheel.

I have found it advantageous to employ the plate-links 2 3 outside of the solid links 4 in the chain C, (shown in Figs. 2 and 3,) and the projections 5 of the sprocket-wheel come between the plate-links 2 and 3 and also between the intermediate links 4, and the rear ends of the links 2 and 3 are widened outwardly and provided with the cross-pins 6, forming the angular bearings of the re-respective links, and it will be observed by reference to Fig. 3 that these angular bearings 6 are at outward angles between the pivots of the links and come into contact with the respective projections 5 on the sprocket-wheel farther away from the center of the wheel than the pivots, and as each link in succession assumes a straight tangential position as it swings from the angular position the angular bearing 6 is swung back from contact with the projection 5, and in so doing the strain is transferred from the bearing of the link that is coming into a straight line to the bearing of the next link in the rear that still remains in an angular position, and the tension is taken upon the pivot-pins successively as the links come into a straight line, whereas when the links are in an angular position one to another around the driven sprocket-wheel there is but little tension on the pivot-pins 7 of the links, because the strain is taken by the angular bearings 6 upon the respective projections 5 of the sprocket-wheel. By this construction the wear upon the pivot-pins is reduced to a minimum and also the wear upon the projections of the sprocket-wheels and upon the chain, and as the angular bearing swings back from its projection upon the sprocket-wheel and the strain is transferred from one angular bearing to the next, the movement being substantially gradual, there is no risk of injury from concussion even when the parts may have become loose in consequence of wear upon the pivot-pins of the chain.

In Figs. 4 and 5 the operations of the respective parts are identically the same as before described; but the chain is here represented as having converging links 8 and 9, that pass in between the wider ends of the next links, so as to render it unnecessary to use the short intermediate links 4. (Shown in Figs. 2 and 3.)

In Fig. 6 the chain is represented as provided with a cam-shaped bearing 10, resting against the side of the projection upon the sprocket-wheel and acting in the manner before described, because the outer angular portion or point of the heart-shaped bearing swings back from the sprocket-wheel projection as the chain-link 16 comes into a straight tangential line.

I claim as my invention—

1. A chain for sprocket-wheels having links and cross-pivots connecting the links and rigid bearings upon the links, which bearings are farther from the axis of the sprocket-wheel than the pivots of the links and toward the rear ends of the links as they leave the sprocket-wheel so that such bearings only contact with the projections on the sprocket-wheel beyond the chain-pivots and swing back from the projections as the links draw into a straight tangential position, substantially as set forth.

2. The combination with a driven sprocket-wheel, of a chain having plate-links, cross-pins connecting the links of the chain and forming pivots, and rigid bearings across the plate-links and occupying positions triangular to the pivot-pins and farther from the axis of the sprocket-wheel so that such bearings only contact with the projections of the sprocket-wheel beyond the chain-pivots and swing back from the projections as the links draw into a tangential position, substantially as set forth.

Signed by me this 1st day of November, 1895.

GEORGE W. BUFFORD.

Witnesses:
W. H. PARIS,
FLOYD H. SANFORD.